United States Patent
Wåhlin

[19]
[11] Patent Number: 5,816,734
[45] Date of Patent: Oct. 6, 1998

[54] CONNECTION DEVICE

[75] Inventor: Olof Wåhlin, Västra Frölunda, Sweden

[73] Assignee: Foga System International AB, Vastra Frolunda, Sweden

[21] Appl. No.: 765,394

[22] PCT Filed: May 17, 1995

[86] PCT No.: PCT/SE95/00550

§ 371 Date: Jan. 6, 1997

§ 102(e) Date: Jan. 6, 1997

[87] PCT Pub. No.: WO96/01376

PCT Pub. Date: Jan. 18, 1996

[30] Foreign Application Priority Data

Jul. 4, 1994 [SE] Sweden ................................. 9402361

[51] Int. Cl.⁶ .................................................. B25G 3/02
[52] U.S. Cl. ........................ 403/362; 403/231; 403/316; 403/362; 403/405.1
[58] Field of Search .................................. 403/231, 252, 403/255, 353, 362, 329, 315, 316, 321, 405.1

[56] References Cited

U.S. PATENT DOCUMENTS

| | | |
|---|---|---|
| 3,672,710 | 6/1972 | Kroopp . |
| 4,334,797 | 6/1982 | Wahlin . |
| 4,641,983 | 2/1987 | Strässle . |
| 4,752,150 | 6/1988 | Salice ................................ 403/231 X |
| 4,787,769 | 11/1988 | Michael ................................ 403/252 |
| 4,826,345 | 5/1989 | Salice .................................... 403/231 |
| 4,893,959 | 1/1990 | Offenbroich ....................... 403/255 X |
| 4,983,065 | 1/1991 | Spath ................................. 403/255 X |
| 5,209,598 | 5/1993 | Zullig ................................. 403/231 X |
| 5,281,045 | 1/1994 | Ichikawa ............................... 403/329 |

FOREIGN PATENT DOCUMENTS

| | | | |
|---|---|---|---|
| 120321 | 5/1971 | Denmark . | |
| 2624273 | 12/1977 | Germany ............................... 403/255 |
| 2812502 | 9/1979 | Germany ............................... 403/255 |
| 3819609 | 12/1989 | Germany ............................... 403/255 |
| 410649 | 10/1979 | Sweden . | |
| 457454 | 12/1988 | Sweden . | |

*Primary Examiner*—Daniel P. Stodola
*Assistant Examiner*—Bruce A. Lev
*Attorney, Agent, or Firm*—Dvorak & Orum

[57] ABSTRACT

An arrangement for a connection device for providing detachable connection of pairs of elements through a displaceable piston capable of actuation by spring force. The spring is accommodated internally within a cavity in a connection sleeve with a retaining end of the piston and is capable of being locked in a connection position by a locking screw that interacts with an inclined tensioning surface in the piston and with a gripping device projecting from the cavity on a connecting end of the piston. The gripping device faces outward from the cavity. A lock is present between the sleeve and the piston to limit the projection of the piston from the internal cavity of the sleeve.

8 Claims, 5 Drawing Sheets

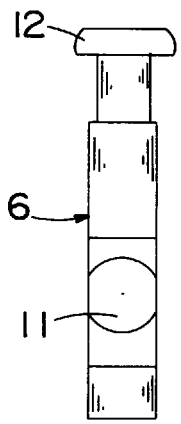
FIG. 8    FIG. 8A
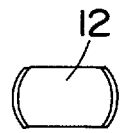
FIG. 8B    FIG. 8C

CONNECTION DEVICE

BACKGROUND OF THE INVENTION

The present invention relates to a connection arrangement designed to provide detachable connection of pairs of elements by means of a displaceable piston capable of actuation by spring force, which is capable of being accommodated internally within a cavity in a connection sleeve with the retaining end of the piston and capable of being locked in the connection position by means of a locking screw that is capable of interacting with an inclined tensioning surface in the piston and with a gripping device projecting from said cavity on the connecting end of the piston facing outwards from the cavity in the aforementioned first element.

SUMMARY OF THE INVENTION

The principal object of the present invention is to provide a connection which is capable of being assembled and then used without the risk of its constituent components working loose from one another in the connection.

Said object is achieved by means of an arrangement in accordance with the present invention, which is characterized essentially in that a lock is present between the aforementioned sleeve and the piston to limit the projection of the piston from the internal cavity of the aforementioned sleeve, which lock is arranged at a distance from the accommodating part of the locking screw in the sleeve of the connection selected in such a way that it essentially coincides with the distance between the tensioning surface and a gripping and interacting stop for the lock in the piston.

DETAILED DESCRIPTION OF THE DRAWINGS

The invention is described below with reference to the accompanying drawings, in which.

Figure 1:
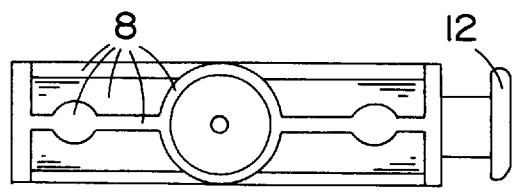
FIG. 1 shows a plan view of a connection in the position ready for connection viewed from below.
Figure 1A:
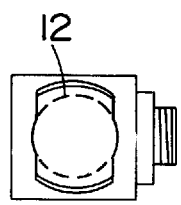
FIGS. 1A and 1B show end views of the connection.
Figure 1B:
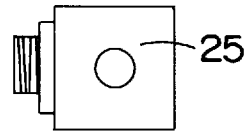
Figure 2:
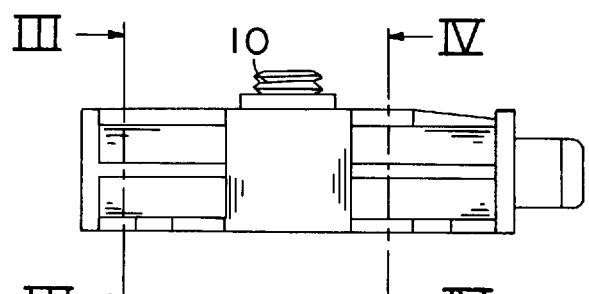
FIG. 2 shows a plan view of a connection in the position ready for connection viewed from the side.
Figure 3:
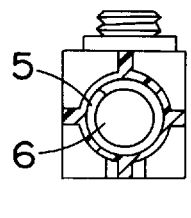
FIG. 3 shows a sectional view along the line III—III in FIG. 2.
Figure 4:
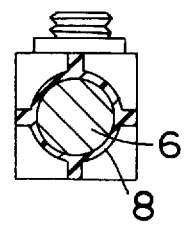
FIG. 4 shows a sectional view along the line IV—IV in FIG. 2.
Figure 5:
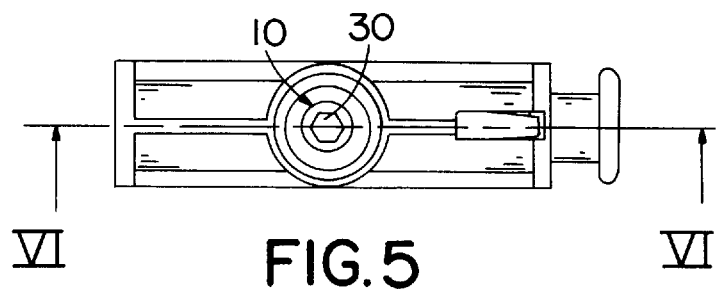
FIG. 5 shows a plan view of a connection in the position ready for connection viewed from above.
Figure 6:
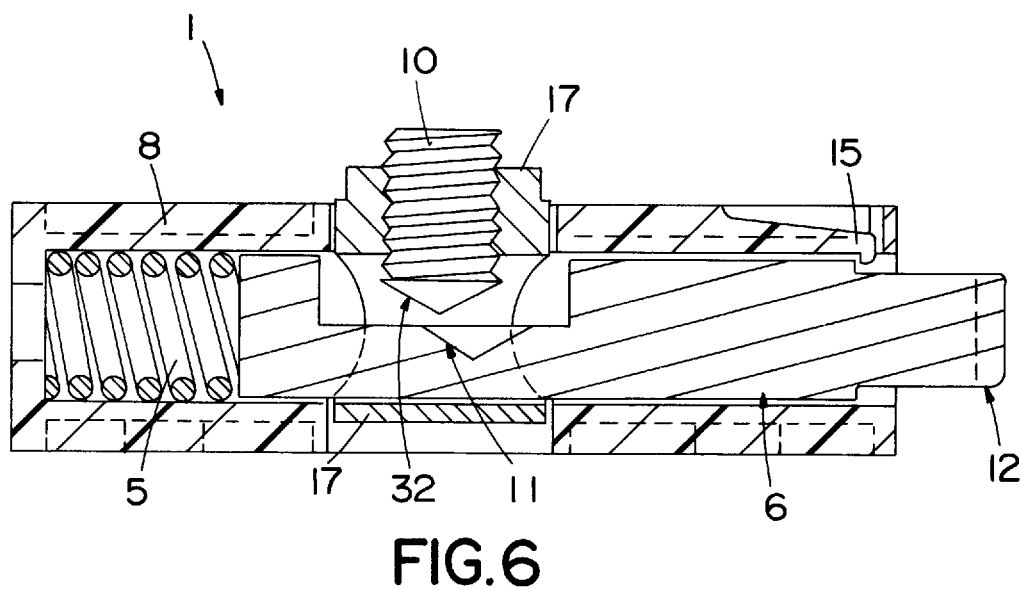
FIG. 6 shows a sectional view of the connection along the line IV—IV in FIG. 5.
Figure 7:
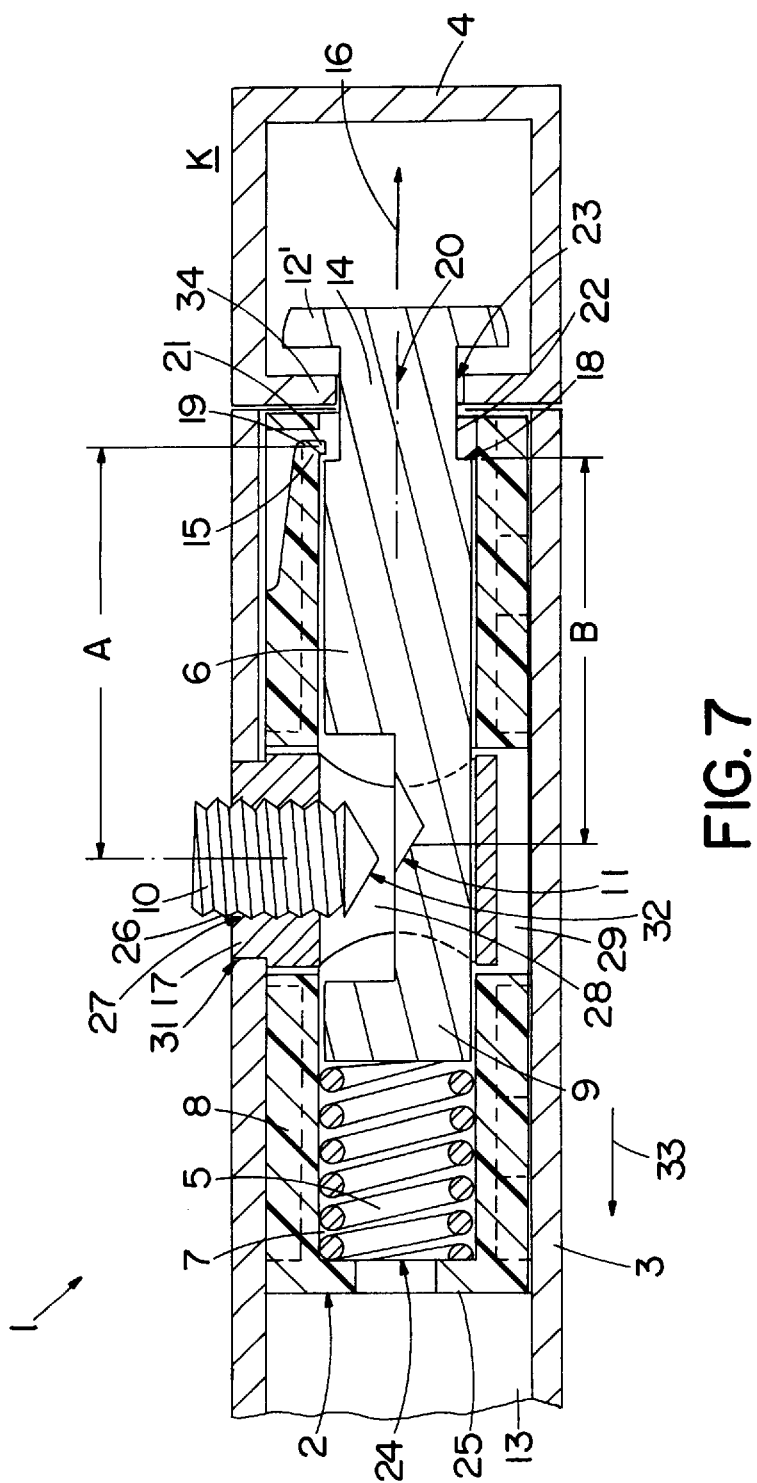
FIG. 7 shows a sectional view of the connection in the connected position.
Figure 9:
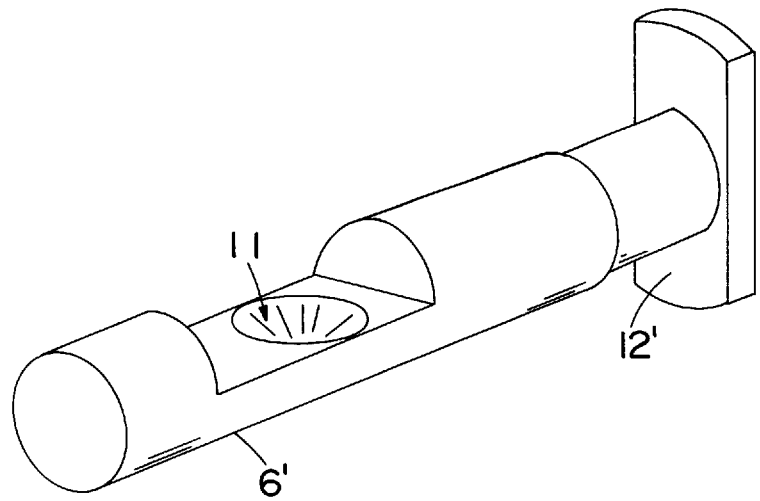

FIGS. 8, 8A, 8B, and 8C show a first illustrative embodiment of a locking piston;

FIG. 9 shows a second illustrative embodiment of a locking piston; and

Figure 10:
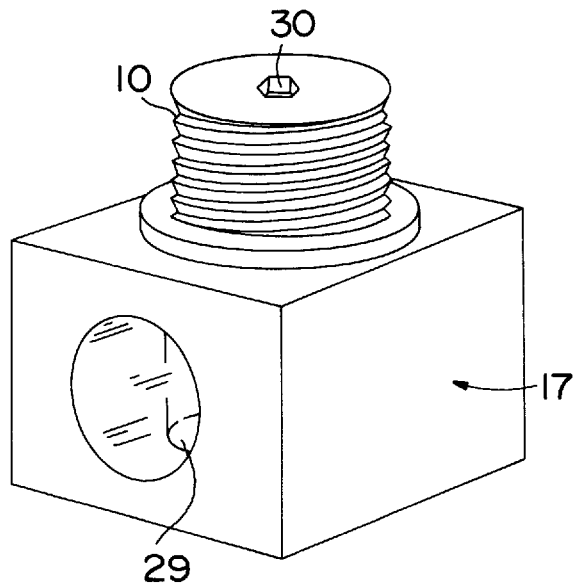

FIG. 10 shows an accommodating body viewed in perspective.

DETAILED DESCRIPTION OF THE PREFERRED EMBODIMENT

An arrangement 1 for a connection 2 designed to provide detachable connection of pairs of elements 3, 4, such as building elements, by means of a piston 6 capable of being displaced by a spring 5 through actuation by spring force, which piston is capable of being accommodated internally within an elongated cavity 7 in a connection sleeve 8 with the retaining end of the piston 9 and capable of being locked in the connection position K by means of a locking screw 10 that is capable of interacting with an inclined tensioning surface 11 in the piston 6, and with a gripping device 12 projecting from said cavity 7 on the connecting end 14 of the piston 6 facing outwards from the cavity 13 in the aforementioned first element, comprises a lock 15 for the aforementioned piston 6. More specifically, the aforementioned lock 15 is present between the aforementioned sleeve 8 and the piston 6 in order, with the connection in its installed position, to limit the projection of the piston in the direction 16 from the internal cavity 7 of the aforementioned sleeve. The aforementioned lock 15 is arranged at a distance A from the accommodating part 17 of the locking screw in the sleeve 8 of the connection selected in such a way that the distance A essentially coincides with the distance B between the tensioning surface 11 of the piston 6 and a gripping and interacting stop 18 for the lock 15 in the piston 6.

The lock is preferably in the form of a pivoting tongue 15 in the sleeve 8 of the connection.

Present at the freely pivoting end 19 of the locking tongue is a locking part 21 thickened in a direction inwards towards the center 20 of the sleeve.

The aforementioned locking part 21 is preferably so arranged as to be capable of being accommodated in a tapering part 22 or some other recess in the piston 6 in the aforementioned locked position.

In order to permit simple manufacture of the connection 2, and in order to obtain a spring effect in the locking tongue 15, the sleeve 8 is made of plastic material.

In order to permit the desired connection of the elements 3, 4 in desired angular positions, pairs of pistons 6, 6' (not shown) which exhibit gripping devices 12, 12' (not shown) can be arranged at an angle in relation to one another, which gripping devices fit and are accommodated in inlet openings 23 in an opposing element 4.

The piston 6 is appropriately accommodated in a cavity 7 which extends along the central axis 20 of the sleeve inside the sleeve 8, and in the bottom 24 of which the pressure spring 5 is accommodated so as to act between a sleeve end wall 25 and the rear end 9 of the piston.

The aforementioned screw 10 acting between the sleeve 8 and the piston 6 is capable of being screwed into a removable receiving body 17 disposed in receiving hole 29 extending through sleeve 8. The sleeve 8 includes a channel 28 extending across the intended threaded 26 receiving space 27 of the screw.

The aforementioned receiving body 17 and an intended receiving hole 29, which extends crosswise through the sleeve 8 and perpendicular to its longitudinal cavity 7, exhibit congruent form. In order to permit simple and reliable installation of the connection 2, the peripheral form of the aforementioned body 17 and the hole 29 is asymmetrical, and preferably rectangular.

The lock 15 retains the piston 6 in the sleeve 8 in such a way that the connection 2 does not disintegrate after it has been assembled and installed.

In other respects the connection 2 functions in the same way as previously disclosed similar connections, for example as disclosed respectively in SE,B,465 279 and 457 454, in that the screw 10 is screwed, using an Allen key that fits in the hexagonal socket 30 in the screw, through a transcurrent opening 31 in the element 3, so that the screw 10 with its angled point 32 presses against the tensioning surface 11, causing the piston 6 to be displaced against the bottom of the sleeve in the direction of the arrow 33, in conjunction with which the gripping device 12 is forced against the wall 34 of the second element 4 provided with a hole 23 for the purpose of clamping the elements 3, 4 against one another with the connection 2 concealed inside the element 3.

The invention is not restricted to the illustrative examples described above and shown in the drawings, but may be varied within the scope of the Patent claims without departing from the idea of invention.

I claim:

1. An arrangement for a connection designed to provide detachable connection of pairs of elements comprising; a displaceable piston capable of actuation by spring force having an inclined tensioning surface, and a lock engaging tapering surface;

a connection sleeve having an internal into which the displaceable piston is accommodated, the connection sleeve accommodating a retaining end of the piston and capable of being locked in a connection position by means of a locking screw;

the locking screw capable of interacting with said inclined tensioning surface in the piston and with a gripping device projecting from the cavity on the connecting end of the piston facing outwards from the cavity in the connection sleeve;

a lock present between the connection sleeve and the piston to limit the projection of the piston from the internal cavity of the sleeve, said lock in the form of pivoting tongue formed in said connection sleeve, wherein a free end of said pivoting tongue is formed as a locking part arranged to be accommodated in the piston tapering surface, said locking part thickened in a direction towards a center of the sleeve, said lock made of a plastic material.

the lock arranged at a distance from the locking screw in the sleeve of the connection selected in such a way that it essentially coincides with the distance between a tensioning surface and a gripping and interacting stop for the lock in the displaceable piston.

2. The arrangement of claim 1, wherein the locking part is arranged so as to be capable of being accommodated in a tapering part of the piston in the locked position.

3. The arrangement of claim 2, wherein the receiving body and an intended receiving hole exhibit congruent form.

4. Arrangement of claim 2 wherein the piston is accommodated in the sleeve having a hole, a bottom of the sleeve having a pressure spring accommodated so as to act respectively between a sleeve end wall and the end of the piston.

5. The arrangement of claim 1, wherein the piston is accommodated in the sleeve having a hole, a bottom of the sleeve having a pressure spring accommodated so as to act respectively between a sleeve end wall and the piston.

6. The arrangement of claim 1, wherein the locking screw is capable of being screwed into a removable receiving body in the sleeve (8), the sleeve exhibiting a channel extending across an intended receiving space of the screw.

7. Arrangement of claim 1 wherein the piston is accommodated in the sleeve having a hole, a bottom of the sleeve having a pressure spring accommodated so as to act respectively between a sleeve end wall and the end of the piston.

8. A connection device arrangement for connecting a pair of elements together, comprising:

a connection sleeve having a bottom and top end and an axial cavity extending therethrough, one of said ends delimited by an end wall, the other end open, said connection sleeve including a receiving hole extending peripherally through said sleeve, said receiving hole disposed between said ends of said sleeve;

a displaceable piston received within said cavity, said piston having a rear retaining end, a front connecting end and an inclined tensioning surface therebetween, said connecting end including a tapering part that defines a piston stop at one end thereof and a gripping device at another end thereof;

a spring inserted within said cavity between said end wall and said piston, said spring for biasing said piston towards said open end of said sleeve to a connection position;

a receiving body disposed within said receiving hole of said connection sleeve, said receiving body including an axial channel congruent with said cavity of said connection sleeve and a threaded receiving space extending into said channel, said receiving space normal to said channel;

a locking screw for interacting with said inclined tensioning surface, said locking screw threadably receivable in said threaded receiving space of said receiving body;

and wherein said connection device arrangement includes a lock internally formed at the top end of said connection sleeve, said lock comprised of a pivoting tongue axially arranged and having an end formed as a thickened locking part, said thickened locking part extending substantially in a perpendicular direction towards said cavity, said lock adapted to urge said locking part against said piston stop to prevent axial piston displacement out of said cavity of said connection sleeve.

* * * * *